United States Patent
Kawasaki et al.

(10) Patent No.: US 9,748,608 B2
(45) Date of Patent: Aug. 29, 2017

(54) SECOND BATTERY COMPRISING A PHOSPHATE ESTER COMPOUND AND A FLUORINATED CARBONATE COMPOUND

(71) Applicant: NEC Corporation, Tokyo (JP)

(72) Inventors: Daisuke Kawasaki, Tokyo (JP); Kazuaki Matsumoto, Tokyo (JP)

(73) Assignee: NEC Corporation, Tokyo (JP)

( * ) Notice: Subject to any disclaimer, the term of this patent is extended or adjusted under 35 U.S.C. 154(b) by 352 days.

(21) Appl. No.: 14/382,445

(22) PCT Filed: Feb. 4, 2013

(86) PCT No.: PCT/JP2013/052484
§ 371 (c)(1),
(2) Date: Sep. 2, 2014

(87) PCT Pub. No.: WO2013/129033
PCT Pub. Date: Sep. 6, 2013

(65) Prior Publication Data
US 2015/0093631 A1    Apr. 2, 2015

(30) Foreign Application Priority Data
Mar. 2, 2012  (JP) ................ 2012-047364

(51) Int. Cl.
*H01M 4/48* (2010.01)
*H01M 4/62* (2006.01)
(Continued)

(52) U.S. Cl.
CPC ......... *H01M 10/0569* (2013.01); *H01M 2/02* (2013.01); *H01M 2/0257* (2013.01);
(Continued)

(58) Field of Classification Search
CPC ......... H01M 10/0525; H01M 10/0567; H01M 10/0569; H01M 10/0585; H01M 4/13;
(Continued)

(56) References Cited

U.S. PATENT DOCUMENTS

2002/0031703 A1\* 3/2002 Kameyama ......... H01M 2/0212
429/162
2006/0172201 A1  8/2006 Yasukawa et al.
(Continued)

FOREIGN PATENT DOCUMENTS

CN    101847750 A    9/2010
CN    102195084 A    9/2011
(Continued)

OTHER PUBLICATIONS

Machine Translation of: JP 10/154528A, Yokoyama et al., Jun. 9, 1998.*
(Continued)

*Primary Examiner* — Kenneth Douyette
(74) *Attorney, Agent, or Firm* — Finnegan, Henderson, Farabow, Garrett & Dunner, L.L.P.

(57) ABSTRACT

The present invention relates to a secondary battery, comprising an electrode element comprising a positive electrode and a negative electrode placed opposite to each other, an electrolyte, and an outer package housing the electrode element and the electrolyte; wherein
the negative electrode is formed by binding a negative electrode active material, which comprises a metal (a) capable of being alloyed with lithium, a metal oxide (b) capable of intercalating/deintercalating lithium ions, and a carbon material (c) capable of intercalating/deintercalating lithium ions, to a negative electrode current collector with a negative electrode binder; and
the electrolyte comprises a lithium salt dissolved in a solvent comprising 65 vol % or more of a phosphate
(Continued)

ester compound, and more than 0 vol % and less than 20 vol % of a fluorinated carbonate compound.

14 Claims, 1 Drawing Sheet

(51) Int. Cl.

| | | |
|---|---|---|
| *H01M 4/58* | (2010.01) | |
| *H01M 10/0569* | (2010.01) | |
| *H01M 10/0567* | (2010.01) | |
| *H01M 10/0585* | (2010.01) | |
| *H01M 10/0525* | (2010.01) | |
| *H01M 2/02* | (2006.01) | |
| *H01M 4/13* | (2010.01) | |
| *H01M 4/38* | (2006.01) | |
| *H01M 4/587* | (2010.01) | |

(52) U.S. Cl.
CPC ............ *H01M 4/13* (2013.01); *H01M 4/483* (2013.01); *H01M 4/58* (2013.01); *H01M 4/62* (2013.01); *H01M 4/622* (2013.01); *H01M 10/0525* (2013.01); *H01M 10/0567* (2013.01); *H01M 10/0585* (2013.01); *H01M 2/0285* (2013.01); *H01M 4/386* (2013.01); *H01M 4/587* (2013.01); *H01M 2300/0034* (2013.01); *H01M 2300/0037* (2013.01); *Y02T 10/7011* (2013.01)

(58) Field of Classification Search
CPC ...... H01M 4/483; H01M 4/58; H01M 4/0428; H01M 4/134; H01M 4/1395
See application file for complete search history.

(56) References Cited

U.S. PATENT DOCUMENTS

| 2009/0239151 A1* | 9/2009 | Nakanishi | ........... H01M 4/0428 429/231.95 |
|---|---|---|---|
| 2009/0325065 A1 | 12/2009 | Fujii et al. | |
| 2011/0244333 A1* | 10/2011 | Kawada | ................ H01M 4/131 429/231.8 |

FOREIGN PATENT DOCUMENTS

| CN | 102214824 A | 10/2011 |
|---|---|---|
| JP | 6-325765 | 11/1994 |
| JP | 10-154528 | 6/1998 |
| JP | 11-317232 | 11/1999 |
| JP | 2000-12080 | 1/2000 |
| JP | 2000-195544 | 7/2000 |
| JP | 2003-123740 | 4/2003 |
| JP | 2003-173819 | 6/2003 |
| JP | 2004-22433 | 1/2004 |
| JP | 2004-47404 | 2/2004 |
| JP | 2007-299542 | 11/2007 |
| JP | 2008-153117 | 7/2008 |
| JP | 2011-96638 | 5/2011 |
| JP | 2011-222151 | 11/2011 |

OTHER PUBLICATIONS

International Search Report mailed Mar. 12, 2013 in corresponding PCT application.
Chinese Office Action issued by the Chinese Patent Office in counterpart Chinese Patent Application No. 201380012173.9, dated Dec. 14, 2015.

* cited by examiner

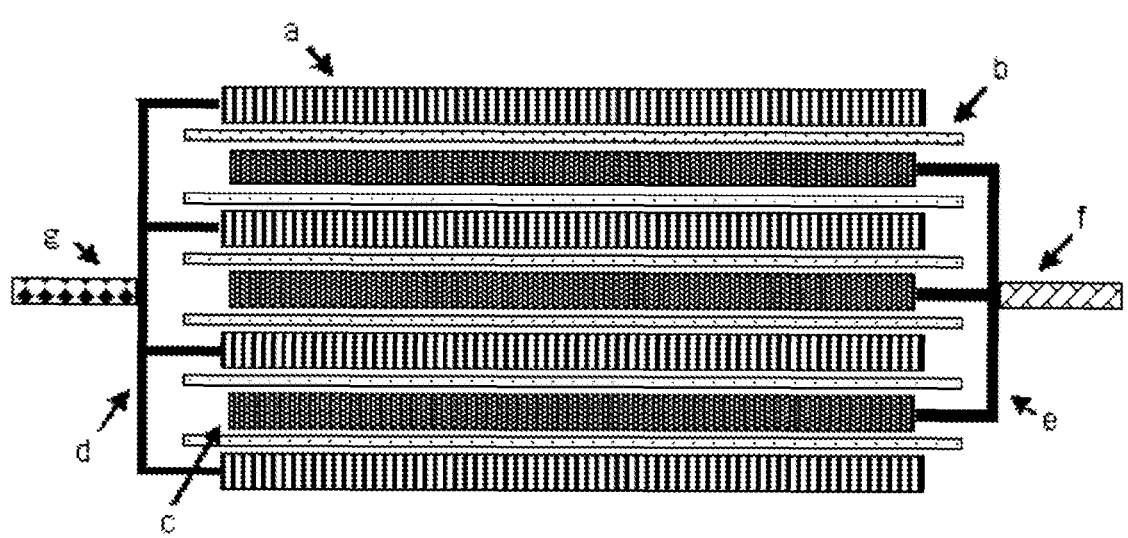

SECOND BATTERY COMPRISING A PHOSPHATE ESTER COMPOUND AND A FLUORINATED CARBONATE COMPOUND

CROSS-REFERENCE TO RELATED PATENT APPLICATIONS

This application is a National Stage Entry of International Application No. PCT/JP2013/052484, filed Feb. 4, 2013, which claims priority from Japanese Patent Application No. 2012-047364 filed Mar. 2, 2012. The entire contents of the above-referenced applications are expressly incorporated herein by reference.

TECHNICAL FIELD

The present invention relates to a secondary battery, and more specifically relates to a lithium ion secondary battery.

BACKGROUND ART

With the rapid expansion of market of notebook computers, cellular phones, electric vehicles, and the like, there is a need for a secondary battery having high energy density. Examples of the means for obtaining a secondary battery having high energy density include a method in which a negative electrode material having a large capacity is used, and a method in which a non-aqueous electrolyte with excellent stability is used.

Patent Literature 1 discloses a secondary battery comprising a lithium-containing silicon oxide or silicate as a negative electrode active material. Patent Literature 2 discloses a negative electrode for a secondary battery comprising an active material layer comprising a particle of a carbon material capable of intercalating/deintercalating lithium ions, a particle of a metal capable of being alloyed with lithium, and a particle of an oxide capable of intercalating/deintercalating lithium ions. Patent Literature 3 discloses a negative electrode material for a secondary battery, wherein a surface of a particle having a structure in which microcrystalline silicon is dispersed in a silicon compound is coated with carbon. Moreover, Patent Literature 4 discloses a technique for doping a silicon-silicon oxide composite, which is coated with carbon, with lithium.

Patent Literature 5 and Patent Literature 6 disclose that a thermosetting resin which undergoes dehydration/condensation reaction by heating, or polyimide is used as a negative electrode binder when a negative electrode active material contains silicon.

Patent Literature 7 proposes a non-aqueous electrolyte comprising a trialkyl phosphate, more specifically, trimethyl phosphate, triethyl phosphate, or the like. Patent Literature 8 discloses a secondary battery, wherein a negative electrode is formed by binding a negative electrode active material, which comprises a carbon material capable of intercalating/deintercalating lithium ions, a metal capable of being alloyed with lithium, and a metal oxide capable of intercalating/deintercalating lithium ions, to a negative electrode current collector with a negative electrode binder; and an electrolyte comprises a liquid medium such as a phosphate ester compound and a fluorinated phosphate ester compound, which hardly forms carbon dioxide, in a concentration of 10 to 80 vol %.

Meanwhile, Patent Literature 9 discloses a non-aqueous electrolyte for a secondary battery, comprising a phosphate ester compound and a halogen-containing cyclic carbonate ester, and discloses that the volume ratio of the halogen-containing cyclic carbonate ester to the phosphate ester is preferably within a range of 10:1 to 1:2 (i.e., the amount of the halogen-containing cyclic carbonate ester is approximately 90.9 to 33.3 vol %, and the amount of the phosphate ester is approximately 9.1 to 66.7 vol %).

CITATION LIST

Patent Literature

Patent Literature 1: Japanese Patent Laid-Open No. H06-325765
Patent Literature 2: Japanese Patent Laid-Open No. 2003-123740
Patent Literature 3: Japanese Patent Laid-Open No. 2004-47404
Patent Literature 4: Japanese Patent Laid-Open No. 2011-222151
Patent Literature 5: Japanese Patent Laid-Open No. 2004-22433
Patent Literature 6: Japanese Patent Laid-Open No. 2008-153117
Patent Literature 7: Japanese Patent Laid-Open No. H11-317232
Patent Literature 8: Japanese Patent Laid-Open No. 2011-96638
Patent Literature 9: Japanese Patent Laid-Open No. H10-154528

SUMMARY OF INVENTION

Technical Problem

However, a secondary battery comprising silicon oxide as a negative electrode active material as described in Patent Literature 1 has a problem that the reduction in capacity is significantly great during a charge/discharge cycle when the secondary battery is charged and discharged at 45° C. or higher.

The negative electrode for a secondary battery as described in Patent Literature 2 has the effect of reducing the change of the volume of the negative electrode as a whole while intercalating/deintercalating lithium ions, due to the difference in charge/discharge potential of the three components. The negative electrode material for a secondary battery as described in Patent Literature 3 also has the effect of reducing the change of the volume of the negative electrode as a whole. Meanwhile, the negative electrode material for a secondary battery as described in Patent Literature 4 may improve the energy density of the secondary battery. In Patent Literatures 2 to 4, however, the binder, the electrolyte, the electrode element structure, and the outer package, which are indispensable for forming a lithium ion secondary battery, are not sufficiently studied in some points.

In Patent Literature 5 and Patent Literature 6, the state of the negative electrode active material is not sufficiently studied, and the electrolyte, the electrode element structure, and the outer package, which are indispensable for forming a lithium ion secondary battery, are not sufficiently studied in some points.

In Patent Literature 7, the materials and the states of the binder, the electrode element structure, the outer package, and the negative electrode, which are indispensable for forming a lithium ion secondary battery, are not sufficiently studied in many points.

In Patent Literature 8, although a phosphate ester compound is described as a solvent for an electrolyte, a co-solvent and an electrolyte additive thereof are not sufficiently studied in some points.

Also, in Patent Literature 9, the materials and the states of the binder, the electrode element structure, the outer package, and the negative electrode, which are indispensable for forming a lithium ion secondary battery, are not sufficiently studied in some points.

As for a lithium ion secondary battery comprising silicon or silicon oxide as a negative electrode active material, in particular, many capacitive components become irreversible during initial charging, and in some cases, the secondary battery expands when the secondary battery is charged and discharged in a high-temperature environment, resulting in the reduction in the capacity retention, for example, and the problem of the reduction in the cycle characteristics arises, although the secondary battery has high capacity.

Meanwhile, in some cases, when a lithium ion secondary battery is impacted, the cell temperature rapidly increases. In general, when the cell temperature increases, the viscosity of the electrolyte decreases, and the ion conductivity increases. Thus, from the viewpoint of improvements in some battery characteristics, the increase in the cell temperature is preferred. An excessively increased cell temperature, however, causes deterioration of the active material, and liquid shortage due to the evaporation of the electrolyte. In addition, when the rapid temperature increase is caused by an impact, there is a risk of adverse effect on an IC circuit and peripheral equipment in the case where the secondary battery is incorporated into a device, and therefore a mechanism such as a temperature-control device needs to be installed.

Thus, an object of the present invention is to solve the problems as described above, and to provide a secondary battery which has a high energy density and excellent cycle characteristics at high temperature, and exhibits less temperature increase when being impacted.

Solution to Problem

The present invention relates to a secondary battery, comprising an electrode element comprising a positive electrode and a negative electrode placed opposite to each other, an electrolyte, and an outer package housing the electrode element and the electrolyte; wherein the negative electrode is formed by binding a negative electrode active material, which comprises a metal (a) capable of being alloyed with lithium, a metal oxide (b) capable of intercalating/deintercalating lithium ions, and a carbon material (c) capable of intercalating/deintercalating lithium ions, to a negative electrode current collector with a negative electrode binder; and the electrolyte comprises a lithium salt dissolved in a solvent comprising 65 vol % or more of a phosphate ester compound, and more than 0 vol % and less than 20 vol % of a fluorinated carbonate compound.

Advantageous Effects of Invention

The present invention may provide a secondary battery which has a high energy density and excellent cycle characteristics at high temperature, and exhibits less temperature increase when being impacted.

BRIEF DESCRIPTION OF DRAWING

FIG. 1 is a schematic sectional view showing the structure of an electrode element comprised in a stacked laminate type secondary battery.

DESCRIPTION OF EMBODIMENTS

An embodiment of the present invention is described below in detail.

The secondary battery of the present invention comprises an electrode element comprising a positive electrode and a negative electrode placed opposite to each other, and an electrolyte, which are housed in an outer package. The negative electrode is formed by binding a negative electrode active material, which comprises a metal (a) capable of being alloyed with lithium, a metal oxide (b) capable of intercalating/deintercalating lithium ions, and a carbon material (c) capable of intercalating/deintercalating lithium ions, to a negative electrode current collector with a negative electrode binder. The electrolyte comprises a lithium salt dissolved in a solvent comprising 65 vol % or more of a phosphate ester compound and more than 0 vol % and less than 20 vol % of a fluorinated carbonate compound.

The shape of the secondary battery of the present invention is not particularly limited. Any of a cylindrical type, a flat-wound rectangular type, a stacked rectangular type, a coin type, a flat-wound laminate type, and a stacked laminate type may be used, but a stacked laminate type is preferred.

A schematic sectional view showing the structure of an electrode element comprised in a stacked laminate type secondary battery is illustrated in FIG. 1. The electrode element is formed by stacking a plurality of positive electrodes (c) and a plurality of negative electrodes (a) alternately with separators (b) sandwiched therebetween. Each of the positive electrodes (c) has a positive electrode current collector (e) which is welded to each other at the end not covered with the positive electrode active material and electrically connected to each other. The welded spot is welded to a positive electrode terminal (f). Each of the negative electrodes (a) has a negative electrode current collector (d) which is welded to each other at the end not covered with the negative electrode active material and electrically connected to each other. The welded spot is welded to a negative electrode terminal (g).

Such an electrode element having a planar stacked structure comprises no part having small R (a region close to the winding core of a concentric-wound type structure, or a folding region at the end of a flat-wound type structure), and therefore has the advantage that the change of the volume of the electrode during charge/discharge causes less adverse effect as compared with an electrode element having a wound structure. Accordingly, this type of electrode element is particularly effective as an electrode element comprising an active material which readily expands in volume. In an electrode element having a wound structure, the structure is apt to be distorted when the volume change occurs, because the electrodes are bent. It is presumed that when a negative electrode active material having a great volume change during charge/discharge such as silicon oxide is used, in particular, a secondary battery which comprises an electrode element having a wound structure has a greater reduction in capacity during charge/discharge.

On the other hand, an electrode element having a planar stacked structure has a problem that when gas generates between electrodes, the gas is apt to remain between the electrodes. The reason is that an electrode element having a stacked structure allows the gap between electrodes to easily broaden, while an electrode element having a wound structure allows the gap between electrodes to hardly broaden due to the tension exerted on the electrodes. The problem becomes particularly prominent when an outer package is a laminate film.

Meanwhile, a technique for preliminarily doping a silicon-based negative electrode active material with lithium in a powder state by the so-called lithium-doping process as described in Patent Literature 4 (Japanese Patent Laid-Open No. 2011-222151), for example, is effective for enhancement of energy density. As a result of the studies conducted by the inventors, however, it was found that the amount of generated gas increases for the following reasons:

(1) The number of active spots formed of reactants with lithium on the surface of the negative electrode increase;
(2) The reactivity with water in the battery increases; and
(3) Degradation of the positive electrode proceeds due to the reduced irreversible capacity of the negative electrode and the broadened charge/discharge range of the positive electrode;
and therefore the characteristic degradation readily occurs in a laminate type cell, in particular.

The present invention allows a long-term drive of a stacked laminate type lithium ion secondary battery comprising a negative electrode in which a negative electrode active material is preliminarily doped with lithium in a powder state by the lithium-doping process and having a high energy density as described above, in particular.

Each of the constituents of the secondary battery of the present invention is described below in detail. The following embodiment is one example, and the present invention is not limited to the embodiment.

[1] Negative Electrode

A negative electrode is formed by binding a negative electrode active material to a negative electrode current collector with a negative electrode binder so that the negative electrode current collector is covered with the negative electrode active material. In the present invention, a negative electrode active material comprising a metal (a) capable of being alloyed with lithium, a metal oxide (b) capable of intercalating/deintercalating lithium ions, and a carbon material (c) capable of intercalating/deintercalating lithium ions is used.

Examples of the metal (a) to be used include Al, Si, Pb, Sn, In, Bi, Ag, Ba, Ca, Hg, Pd, Pt, Te, Zn and La, and an alloy of two or more of them. The negative electrode active material particularly preferably comprises silicon (Si) as the metal (a).

The content of the metal (a) in the negative electrode active material is preferably, but not limited to, 5 wt % or more and 95 wt % or less, more preferably 10 wt % or more and 90 wt % or less, and further preferably 20 wt % or more and 50 wt % or less, relative to the total of the metal (a), the metal oxide (b), and the carbon material (c).

Examples of the metal oxide (b) to be used include silicon oxide, aluminum oxide, tin oxide, indium oxide, zinc oxide and lithium oxide, and a composite thereof. The negative electrode active material particularly preferably comprises silicon oxide as the metal oxide (b). That is because silicon oxide is relatively stable and hardly reacts with another compound.

Additionally, one, or two or more of elements selected from nitrogen, boron, and sulfur may be added to the metal oxide (b), for example, in an amount of 0.1 to 5 wt %. Thereby the electrical conductivity of the metal oxide (b) may be improved.

It is also preferred that the metal oxide (b) is an oxide of the metal constituting the metal (a).

The content of the metal oxide (b) in the negative electrode active material is preferably, but not limited to, 5 wt % or more and 90 wt % or less, more preferably 40 wt % or more and 80 wt % or less, and further preferably 50 wt % or more and 70 wt % or less, relative to the total of the metal (a), the metal oxide (b), and the carbon material (c).

The whole of, or part of the metal oxide (b) preferably has an amorphous structure. The metal oxide (b) having an amorphous structure may reduce the volume expansion of the carbon material (c) and the metal (a) as other negative electrode active materials, and may suppress the decomposition of the electrolyte. Although the mechanism is not clear, it is presumed that the formation of a film at the interface between the carbon material (c) and the electrolyte is influenced in some ways when the metal oxide (b) has an amorphous structure. It is also presumed that the amorphous structure has relatively less elements associated with non-homogeneity, including grain boundary and defect.

It may be confirmed by X-ray diffraction measurement (common XRD measurement) that the whole of, or part of the metal oxide (b) has an amorphous structure. More specifically, in the case where the metal oxide (b) does not have an amorphous structure, a peak characteristic of the metal oxide (b) is observed; while in the case where the whole of, or part of the metal oxide (b) has an amorphous structure, a broader peak characteristic of the metal oxide (b) is observed.

Moreover, it is preferred that the whole of, or part of the metal (a) is dispersed in the metal oxide (b). When at least part of the metal (a) is dispersed in the metal oxide (b), the volume expansion of the negative electrode as a whole may be further suppressed, and the decomposition of the electrolyte may be also suppressed.

It may be confirmed that the whole of, or part of the metal (a) is dispersed in the metal oxide (b) by transmission electron microscope observation (common TEM observation) in combination with energy dispersive X-ray spectrometry (common EDX measurement). More specifically, it may be confirmed that the metal (a) is dispersed in the metal oxide (b) by observing a cross section of a sample which contains a metal particle (a), and measuring the concentration of oxygen in the metal particle (a) dispersed in the metal oxide (b) to confirm that the metal constituting the metal particle (a) is not converted into an oxide.

Examples of the carbon material (c) to be used include graphite, amorphous carbon, diamond-like carbon, and carbon nanotube, and a composite thereof. Graphite which has high crystallinity has high electrical conductivity, and has excellent adhesion to a positive electrode current collector made of metal such as copper, and excellent voltage flatness. On the other hand, amorphous carbon which has low crystallinity has a high effect of reducing the volume expansion of the negative electrode as a whole due to its relatively small volume expansion, and degradation caused by non-homogeneity, including grain boundary and defect, hardly occurs.

The content of the carbon material (c) in the negative electrode active material is preferably, but not limited to, 2 wt % or more and 50 wt % or less, more preferably 2 wt % or more and 30 wt % or less, relative to the total of the metal (a), the metal oxide (b), and the carbon material (c).

Each of the metal (a), the metal oxide (b), and the carbon material (c) may be used, but not limited to, in the form of a particle. For example, the average particle size of the metal (a) may be smaller than the average particle size of the metal oxide (b) and the average particle size of the carbon material (c). Thereby, the formation of dendrite and the powderization of alloy may be more effectively suppressed because the metal (a), which has a great volume change during charge/discharge, has a relatively small particle size, while the metal oxide (b) and the carbon material (c), which have a small volume change during charge/discharge, have a relatively great particle size. Moreover, in the charge/discharge process, lithium is intercalated into and deintercalated from a particle having a great particle size, a particle having a small particle size, and a particle having a great particle size, in that order. From this point of view, the occurrence of residual stress and residual strain may be suppressed. The metal (a) may have an average particle size of 10 μm or less, for example, and preferably have an average particle size of 5 μm or less.

It is preferred that the whole of, or part of the carbon material (c) is localized in the vicinity of a surface of a particle comprising the metal (a) and the metal oxide (b) in the form of a coating. When the carbon material (c) is localized in the vicinity of a surface of a particle comprising the metal (a) and the metal oxide (b), the aggregation of carbon may be prevented and, from the point of view of the electrode as a whole, the effects of reducing the volume expansion and achieving uniformity of electronic conductivity may be achieved.

The negative electrode active material comprising the metal (a), the metal oxide (b), and the carbon material (c), wherein the whole of, or part of the metal oxide (b) has an amorphous structure, and the whole of, or part of the metal (a) is dispersed in the metal oxide (b), and the carbon material (c) is localized in the vicinity of a surface of a particle comprising the metal (a) and the metal oxide (b), may be produced, for example, by the method described in Patent Literature 3 (Japanese Patent Laid-Open No. 2004-47404). More specifically, the metal oxide (b) may be subjected to CVD treatment in an atmosphere containing an organic gas such as methane gas, to provide a composite in which the metal (a) in the metal oxide (b) is converted into a nanocluster and the surface is coated with the carbon material (c). The negative electrode active material may be also produced by mixing the metal (a), the metal oxide (b), and the carbon material (c) stepwise by mechanical milling.

The negative electrode active material may be doped with lithium in a powder state, for example, according to the method described in Patent Literature 4 (Japanese Patent Laid-Open No. 2011-222151). More specifically, the negative electrode active material may be doped with lithium in a powder state by mixing the negative electrode active material with a lithium doping agent, and then subjecting the mixture to heat treatment at a temperature of 200° C. or higher and 800° C. or lower. Preferred examples of the lithium doping agent therein include lithium hydride, lithium aluminum hydride, and a mixture of lithium hydride and lithium aluminum hydride.

Examples of the negative electrode binder to be used include polyvinylidene fluoride, vinylidene fluoride-hexafluoropropylene copolymer, vinylidene fluoride-tetrafluoroethylene copolymer, styrene-butadiene copolymer rubber, polytetrafluoroethylene, polypropylene, polyethylene, polyimide, and polyamide-imide. Polyimide, poly-amide-imide, or a mixture of polyimide and polyamide-imide may be preferably used. Thereby the cycle characteristics at high temperature may be further improved.

The content of the negative electrode binder in the negative electrode is preferably 5 to 20 wt %, preferably 8 to 15 wt % from the viewpoints of "sufficient binding force" and "higher energy" which are in a trade-off relation.

Preferred examples of the negative electrode current collector include aluminum, nickel, copper and silver, and an alloy thereof, from the viewpoint of electrochemical stability. Examples of the shape thereof include a foil, a flat plate, and a mesh.

The negative electrode may be produced by forming a negative electrode active material layer, which comprises a negative electrode active material and a negative electrode binder, on a negative electrode current collector. Examples of the method for forming a negative electrode active material layer include a doctor blade method, a die coater method, a CVD method, and a sputtering method. Alternatively, a negative electrode active material layer may be formed in advance, and then a thin film of aluminum, nickel, or an alloy thereof, which is used as a negative electrode current collector, may be formed by vapor deposition, sputtering, or the like.

[2] Positive Electrode

A positive electrode is formed by binding a positive electrode active material to a positive electrode current collector with a positive electrode binder so that the positive electrode current collector is covered with the positive electrode active material, for example.

Examples of the positive electrode active material include lithium manganate having a layered structure, or lithium manganate having a spinel structure such as $LiMnO_2$ and $Li_xMn_2O_4$ ($0<x<2$); $LiCoO_2$, $LiNiO_2$, or compounds in which part of the transition metal is substituted with another metal; lithium transition metal oxides in which a specific transition metal is contained in an amount of not more than the half such as $LiNi_{1/3}Co_{1/3}Mn_{1/3}O_2$; and lithium transition metal oxides in which lithium is excessively contained in an amount of more than the stoichiometric composition. As the positive electrode active material, $Li_\alpha Ni_\beta Co_\gamma Al_\delta O_2$ ($1 \leq \alpha \leq 1.2$, $\beta+\gamma+\delta=1$, $\beta \geq 0.7$, $\gamma \geq 0.2$) or $Li_\alpha Ni_\beta Co_\gamma Mn_\delta O_2$ ($1 \leq \alpha \leq 1.2$, $\beta+\gamma+\delta=1$, $\beta \geq 0.6$, $\gamma \leq 0.2$) is particularly preferred. The positive electrode active material may be used alone, or in combination of two or more.

As the positive electrode binder, the same as the negative electrode binder may be used. Among them, polyvinylidene fluoride is preferred from the viewpoints of general-purpose and low-cost. The amount of the positive electrode binder to be used is preferably 2 to 10 parts by weight relative to 100 parts by weight of the positive electrode active material from the viewpoints of "sufficient binding force" and "higher energy" which are in a trade-off relation.

As the positive electrode current collector, the same as the negative electrode current collector may be used.

An auxiliary conducting agent may be added to the positive electrode active material layer comprising the positive electrode active material for the purpose of reducing impedance. Examples of the auxiliary conducting agent include carbonaceous particles such as graphite, carbon black, and acetylene black.

The positive electrode may be produced by forming a positive electrode active material layer, which comprises a positive electrode active material and a positive electrode binder, on a positive electrode current collector, in the same way as the negative electrode.

[3] Electrolyte

The electrolyte to be used in the present invention comprises a lithium salt as a supporting salt dissolved in a solvent, which comprises 65 vol % or more of a phosphate ester compound, and more than 0 vol % and less than 20 vol % of a fluorinated carbonate compound. The solvent of the electrolyte preferably comprises 70 to 99 vol % of a phosphate ester compound, and 1 to 15 vol % of a fluorinated carbonate compound. The content of the phosphate ester compound in the solvent is more preferably 85 to 99 vol %, further preferably 90 to 95 vol %. The content of the fluorinated carbonate compound in the solvent is more preferably 1 to 15 vol %, further preferably 2 to 5 vol %. When a fluorinated carbonate compound is incorporated into a phosphate ester compound-based electrolyte, a film may be formed on a surface of a non-carbon negative electrode such as silicon, and thereby the decomposition of the electrolyte may be suppressed. Moreover, a secondary battery which exhibits less temperature increase when being impacted may be obtained when the content of the phosphate ester compound in the solvent is 65 vol % or more, and the content of the fluorinated carbonate compound in the solvent is less than 20 vol %. The use of a secondary battery which has less temperature increase on impact may eliminate the need for providing a device into which the secondary battery is incorporated with an additional mechanism such as a temperature-control device.

Examples of the phosphate ester compound include a compound represented by the following formula (1).

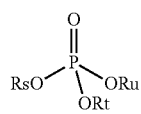

(1)

In the formula (1), Rs, Rt, and Ru each independently represents alkyl group, halogenated alkyl group, alkenyl group, halogenated alkenyl group, aryl group, cycloalkyl group, halogenated cycloalkyl group, or silyl group, or alternatively, any two of, or all of Rs, Rt, and Ru are combined to form a cyclic structure.

The number of carbon atoms of the alkyl group, the halogenated alkyl group, the alkenyl group, the halogenated alkenyl group, the aryl group, the cycloalkyl group, and the halogenated cycloalkyl group is preferably 10 or less. Examples of the halogen atom contained in the halogenated alkyl group, the halogenated alkenyl group, and the halogenated cycloalkyl group include fluorine, chlorine, bromine, and iodine.

In the formula (1), each of Rs, Rt, and Ru is preferably alkyl group having 10 or less carbon atoms.

Examples of the phosphate ester compound include alkyl phosphate ester compounds such as trimethyl phosphate, triethyl phosphate, tripropyl phosphate, tributyl phosphate, tripentyl phosphate, trihexyl phosphate, triheptyl phosphate, trioctyl phosphate, dimethyl ethyl phosphate, dimethyl methyl phosphate (DMMP), and diethyl methyl phosphate; aryl phosphate ester compounds such as triphenyl phosphate; phosphate ester compounds having a cyclic structure such as methyl ethylene phosphate, ethyl ethylene phosphate (EEP), and ethyl butylene phosphate; and halogenated alkyl phosphate compounds such as tris(trifluoromethyl)phosphate, tris(pentafluoroethyl)phosphate, tris(2,2,2-trifluoroethyl)phosphate, tris(2,2,3,3-tetrafluoropropyl)phosphate, tris(3,3,3-trifluoropropyl)phosphate, and tris(2,2,3,3,3-pentafluoropropyl)phosphate. Among them, trialkyl phosphate ester compounds such as trimethyl phosphate, triethyl phosphate, tripropyl phosphate, tributyl phosphate, tripentyl phosphate, trihexyl phosphate, triheptyl phosphate, and trioctyl phosphate may be preferably used as the phosphate ester compound.

The phosphate ester compound may be used alone, or in combination of two or more.

It is preferred that the phosphate ester compound contains no fluorine atom, because it is hard to dissolve a lithium salt used as a supporting salt therein when the phosphate ester compound contains many fluorine atoms.

The fluorinated carbonate compound may be a fluorinated cyclic carbonate compound, or may be a fluorinated chain carbonate compound.

Examples of the fluorinated cyclic carbonate compound include a compound represented by the following formula (2a) or (2b).

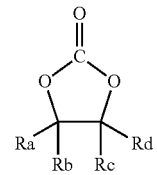

(2a)

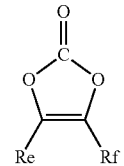

(2b)

In the formula (2a) or (2b), Ra, Rb, Rc, Rd, Re, and Rf each independently represents hydrogen atom, alkyl group, halogenated alkyl group, halogen atom, alkenyl group, halogenated alkenyl group, cyano group, amino group, nitro group, alkoxy group, halogenated alkoxy group, cycloalkyl group, halogenated cycloalkyl group, or silyl group, with the proviso that at least one of Ra, Rb, Rc, and Rd is fluorine atom, fluorinated alkyl group, fluorinated alkenyl group, fluorinated alkoxy group, or fluorinated cycloalkyl group, and at least one of Re and Rf is fluorine atom, fluorinated alkyl group, fluorinated alkenyl group, fluorinated alkoxy group, or fluorinated cycloalkyl group.

The number of carbon atoms of the alkyl group, the halogenated alkyl group, the alkenyl group, the halogenated alkenyl group, the alkoxy group, the halogenated alkoxy group, the cycloalkyl group, and the halogenated cycloalkyl group is preferably 10 or less, more preferably 5 or less. Examples of the halogen atom in the halogenated alkyl group, the halogenated alkenyl group, the halogenated alkoxy group, and the halogenated cycloalkyl group include fluorine, chlorine, bromine, and iodine.

Examples of the fluorinated cyclic carbonate compound include compounds obtained by wholly or partially fluorinating ethylene carbonate, propylene carbonate, vinylene carbonate, and vinylethylene carbonate. Among them, compounds obtained by partially fluorinating ethylene carbonate may be preferably used. More specifically, fluoroethylene carbonate, or difluoroethylene carbonate (cis- or trans-difluoroethylene carbonate) may be preferably used. Among them, fluoroethylene carbonate may be preferably used.

Examples of the fluorinated chain carbonate compound include a compound represented by the following formula (3).

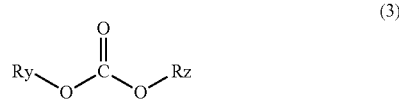

(3)

In the formula (3), Ry and Rz each independently represents hydrogen atom, alkyl group, halogenated alkyl group, halogen atom, alkenyl group, halogenated alkenyl group, cyano group, amino group, nitro group, alkoxy group, halogenated alkoxy group, cycloalkyl group, halogenated cycloalkyl group, or silyl group, with the proviso that at least one of Ry and Rz is fluorine atom, fluorinated alkyl group, fluorinated alkenyl group, fluorinated alkoxy group, or fluorinated cycloalkyl group.

The number of carbon atoms of the alkyl group, the halogenated alkyl group, the alkenyl group, the halogenated alkenyl group, the alkoxy group, the halogenated alkoxy group, the cycloalkyl group, and the halogenated cycloalkyl group is preferably 10 or less, more preferably 5 or less. Examples of the halogen atom in the halogenated alkyl group, the halogenated alkenyl group, the halogenated alkoxy group, and the halogenated cycloalkyl group include fluorine, chlorine, bromine, and iodine.

Examples of the fluorinated chain carbonate compound include bis(1-fluoroethyl) carbonate, bis(2-fluoroethyl) carbonate, 3-fluoropropyl methyl carbonate, and 3,3,3-trifluoropropyl methyl carbonate.

The fluorinated carbonate compound may be used alone, or in combination of two or more.

The electrolyte to be used in the present invention may comprise other organic solvents, so long as the content of the phosphate ester compound and the content of the fluorinated carbonate compound are within the ranges as described above.

Examples of the other organic solvent include ethylene carbonate (EC), propylene carbonate (PC), butylene carbonate (BC), vinylene carbonate (VC), vinylethylene carbonate (VEC), ethylene sulfite (ES), propane sulfone (PS), butane sulfone (BS), dioxathiolane-2,2-dioxide (DD), sulfolene, 3-methyl sulfolene, sulfolane (SL), succinic anhydride (SUCAH), propionic anhydride, acetic anhydride, maleic anhydride, diallyl carbonate (DAC), diphenyl disulfide (DPS), dimethyl carbonate (DMC), ethylmethyl carbonate (EMC), chloroethylene carbonate, diethyl carbonate (DEC), dimethoxyethane (DME), dimethoxymethane (DMM), diethoxyethane (DEE), ethoxy methoxyethane, dimethyl ether, methyl ethyl ether, methyl propyl ether, ethyl propyl ether, dipropyl ether, methyl butyl ether, diethyl ether, phenyl methyl ether, tetrahydrofuran (THF), tetrahydropyran (THP), 1,4-dioxane (DIOX), 1,3-dioxolane (DOL), carbonate electrolyte, ethers, acetonitrile, propionitrile, γ-butyrolactone, γ-valerolactone, ionic liquids, phosphazene, and aliphatic carboxylates such as methyl formate, methyl acetate, and ethyl propionate. Among them, ethylene carbonate, diethyl carbonate, propylene carbonate, dimethyl carbonate, ethylmethyl carbonate, γ-butyrolactone, and γ-valerolactone are preferred.

The other organic solvents may be used alone, or in combination of two or more.

The electrolyte to be used in the present invention comprises a lithium salt as a supporting salt. Examples of the supporting salt include $LiPF_6$, $LiI$, $LiBr$, $LiCl$, $LiAsF_6$, $LiAlCl_4$, $LiClO_4$, $LiBF_4$, $LiSbF_6$, $LiCF_3SO_3$, $LiC_4F_9SO_3$, $LiN(FSO_2)_2$, $LiN(CF_3SO_2)_2$, $LiN(C_2F_5SO_2)_2$, $LiN(CF_3SO_2)(C_2F_5SO_2)$, $LiN(CF_3SO_2)(C_4F_9SO_2)$, $LiN(CF_2SO_2)_2(CF_2)$ which has 5-membered ring structure, $LiN(CF_2SO_2)_2(CF_2)_2$ which has 6-membered ring structure, and lithium salts in which at least one fluorine atom in $LiPF_6$ is substituted with fluorinated alkyl group, including $LiPF_5(CF_3)$, $LiPF_5(C_2F_5)$, $LiPF_5(C_3F_7)$, $LiPF_4(CF_3)_2$, $LiPF_4(CF_3)(C_2F_5)$, and $LiPF(CF_3)_3$.

A compound represented by the following formula (4) may be also used as the supporting salt.

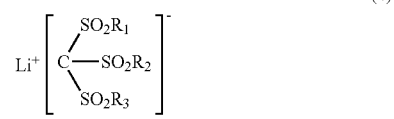

(4)

In the formula (4), $R_1$, $R_2$, and $R_3$ each independently represents halogen atom, or fluorinated alkyl group. Examples of the halogen atom include fluorine, chlorine, bromine, and iodine. The number of carbon atoms of the fluorinated alkyl group is preferably 1 to 10. Examples of the compound represented by the formula (4) include $LiC(CF_3SO_2)_3$ and $LiC(C_2F_5SO_2)_3$.

The supporting salt (lithium salt) may be used alone, or in combination of two or more.

The concentration of the supporting salt (lithium salt) in the electrolyte is preferably 0.01 mol/L or more and 3 mol/L or less, more preferably 0.5 mol/L or more and 1.5 mol/L or less.

[4] Separator

For example, a porous film or a nonwoven fabric made of polypropylene, polyethylene, or the like may be used as the separator. A laminate thereof may be also used as the separator.

[5] Outer Package

Any outer package may be appropriately selected without limitation, so long as it is stable to the electrolyte and has adequate water vapor barrier properties. In the case of a stacked laminate type secondary battery, a laminate film such as an aluminum- or silica-coated polypropylene or polyethylene may be used as the outer package, for example. From the viewpoint of reduction in the volume expansion, an aluminum laminate film may be particularly preferably used.

A secondary battery comprising a laminate film as the outer package exhibits greater deformation of the electrode element when gas generates, as compared with a secondary battery comprising a metal can as the outer package. The reason is that a laminate film readily deforms by the pressure in the secondary battery, as compared with a metal can. Additionally, in the case of a secondary battery comprising a laminate film as the outer package, the pressure in the battery is generally reduced to lower than atmospheric pressure when the battery is sealed, and therefore there is no redundant space in the battery, and the generation of gas, if it occurs, is apt to directly lead to the change of the volume of the battery and the deformation of the electrode element. According to the present invention, however, the problems as described above may be overcome, and thereby there may be provided a stacked laminate type lithium ion secondary battery which is low-cost and has increased flexibility in designing the cell capacity by the change of the number of stacked layers.

The secondary battery of the present invention may be produced by a conventionally known method.

EXAMPLES

The present invention will be described below more specifically with reference to Examples, but the present invention is not limited to these Examples.

Example 1

Tin having an average particle size of 5 μm as the metal (a), silicon oxide having an average particle size of 10 μm as the oxide (b), and graphite having an average particle size of 20 μm as the carbon material (c) were measured out at a weight ratio of 30:60:10 and mixed, to provide a negative electrode active material. The negative electrode active material and polyamide-imide (PAI, made by Toyobo Co., Ltd., trade name: VYLOMAX®) as the negative electrode binder were measured out at a weight ratio of 85:15 and mixed with n-methylpyrrolidone, to provide a negative electrode slurry. The negative electrode slurry was applied to a copper foil having a thickness of 15 μm, and then dried, and further heated at 300° C. in a nitrogen atmosphere, to provide a negative electrode.

Lithium nickelate ($LiNi_{0.80}Co_{0.15}Al_{0.05}O_2$) as the positive electrode active material, carbon black as the auxiliary conducting agent, and polyvinylidene fluoride as the positive electrode binder were measured out at a weight ratio of 90:5:5 and mixed with n-methylpyrrolidone, to provide a positive electrode slurry. The positive electrode slurry was applied to an aluminum foil having a thickness of 20 μm, and then dried, and further compressed, to provide a positive electrode.

Three layers of positive electrodes and four layers of negative electrodes thus obtained were stacked alternately with polypropylene porous films as the separators sandwiched therebetween. The ends of the positive electrode current collectors, which were not covered with the positive electrode active material, were welded together, and the ends of the negative electrode current collectors, which were not covered with the negative electrode active material, were welded together. A positive electrode terminal made of aluminum, and a negative electrode terminal made of nickel were further welded to the welded parts, respectively, to provide an electrode element having a planar stacked structure.

Meanwhile, triethyl phosphate (hereinafter abbreviated as TEP) and fluoroethylene carbonate (hereinafter abbreviated as FEC) were mixed at a ratio of 99:1 (volume ratio), and $LiPF_6$ as the supporting salt was dissolved therein at a concentration of 1 mol/L, which was used as the electrolyte.

The electrode element was packed with an aluminum laminate film as the outer package, and the electrolyte was poured into the outer package, and then the outer package was sealed while the pressure was reduced to 0.1 atm., to provide a secondary battery.

<Charge/Discharge Evaluation>

The obtained secondary battery was charged and discharged at a current of 0.1 C under the condition that the upper limit of the voltage is 4.2 V and the lower limit of the voltage is 2.7 V in an environment at 20° C., and the initial discharge capacity therein was determined. The result is shown in Table 1.

<Cycle Test>

In a thermostatic chamber kept at 45° C., the charge/discharge cycle was repeated 50 times at a current of 0.5 C under the condition that the upper limit of the voltage is 4.2 V and the lower limit of the voltage is 2.7 V. The ratio of the discharge capacity in the 50th cycle to the discharge capacity in the 1st cycle was taken as the retention. The result is shown in Table 1.

<Impact Test>

An aluminum laminate cell was produced in the same way as described above, except that one layer of positive electrode and one layer of negative electrode were placed with a separator therebetween, and the electrolyte was poured therein. The obtained cell was conditioned, and then was charged to the upper limit of the voltage of 4.3 V at a current of 0.2 C, and the cell temperature was measured with a thermocouple attached to the outside of the cell. And then, the cell in the state of charge was impacted by dropping a weight of 5 kg from a height of 50 cm on the cell, and the cell temperature was measured with a thermocouple attached to the outside of the cell. The temperature increase of the cell after the impact test (=(highest cell temperature achieved after the impact test)−(cell temperature before the impact test)) was calculated. The result is shown in Table 1.

Example 2

A secondary battery was produced and evaluated in the same way as in Example 1, except that TEP and FEC were mixed at a ratio of 98:2 (volume ratio) and $LiPF_6$ as the supporting salt was dissolved therein at a concentration of 1 mol/L, which was used as the electrolyte. The results are shown in Table 1.

Example 3

A secondary battery was produced and evaluated in the same way as in Example 1, except that TEP and FEC were mixed at a ratio of 95:5 (volume ratio) and $LiPF_6$ as the supporting salt was dissolved therein at a concentration of 1 mol/L, which was used as the electrolyte. The results are shown in Table 1.

Example 4

A secondary battery was produced and evaluated in the same way as in Example 1, except that TEP and FEC were mixed at a ratio of 90:10 (volume ratio) and $LiPF_6$ as the supporting salt was dissolved therein at a concentration of 1 mol/L, which was used as the electrolyte. The results are shown in Table 1.

Example 5

A secondary battery was produced and evaluated in the same way as in Example 1, except that TEP, FEC, and a mixed carbonate electrolyte (ethylene carbonate/propylene carbonate/diethyl carbonate/ethyl methyl carbonate/dimethyl carbonate=2/2/2/2/2 (volume ratio)) were mixed at a ratio of 70:1:29 (volume ratio) and $LiPF_6$ as the supporting salt was dissolved therein at a concentration of 1 mol/L, which was used as the electrolyte. The results are shown in Table 1.

Example 6

A secondary battery was produced and evaluated in the same way as in Example 1, except that TEP, FEC, and a mixed carbonate electrolyte (ethylene carbonate/propylene carbonate/diethyl carbonate/ethyl methyl carbonate/dimethyl carbonate=2/2/2/2/2 (volume ratio)) were mixed at a ratio of 70:15:15 (volume ratio) and LiPF$_6$ as the supporting salt was dissolved therein at a concentration of 1 mol/L, which was used as the electrolyte. The results are shown in Table 1.

Comparative Example 1

A secondary battery was produced and evaluated in the same way as in Example 1, except that TEP and a mixed carbonate electrolyte (ethylene carbonate/propylene carbonate/diethyl carbonate/ethyl methyl carbonate/dimethyl carbonate=2/2/2/2/2 (volume ratio)) were mixed at a ratio of 99:1 (volume ratio) and LiPF$_6$ as the supporting salt was dissolved therein at a concentration of 1 mol/L, which was used as the electrolyte. The results are shown in Table 1.

Comparative Example 2

A secondary battery was produced and evaluated in the same way as in Example 1, except that TEP and a mixed carbonate electrolyte (ethylene carbonate/propylene carbonate/diethyl carbonate/ethyl methyl carbonate/dimethyl carbonate=2/2/2/2/2 (volume ratio)) were mixed at a ratio of 65:35 (volume ratio) and LiPF$_6$ as the supporting salt was dissolved therein at a concentration of 1 mol/L, which was used as the electrolyte. The results are shown in Table 1.

Comparative Example 3

A secondary battery was produced and evaluated in the same way as in Example 1, except that TEP, FEC, and a mixed carbonate electrolyte (ethylene carbonate/propylene carbonate/diethyl carbonate/ethyl methyl carbonate/dimethyl carbonate=2/2/2/2/2 (volume ratio)) were mixed at a ratio of 63:2:35 (volume ratio) and LiPF$_6$ as the supporting salt was dissolved therein at a concentration of 1 mol/L, which was used as the electrolyte. The results are shown in Table 1.

Comparative Example 4

A secondary battery was produced and evaluated in the same way as in Example 1, except that TEP and FEC were mixed at a ratio of 80:20 (volume ratio) and LiPF$_6$ as the supporting salt was dissolved therein at a concentration of 1 mol/L, which was used as the electrolyte. The results are shown in Table 1.

Comparative Example 5

A secondary battery was produced and evaluated in the same way as in Example 2, except that graphite having an average particle size of 20 μm was used as the negative electrode active material. The results are shown in Table 1.

Comparative Example 6

A secondary battery was produced and evaluated in the same way as in Example 2, except that silicon having an average particle size of 5 μm as the metal (a) and graphite having an average particle size of 20 μm as the carbon material (c) were measured out at a weight ratio of 80:20 and mixed for 24 hours by so-called mechanical milling, which was used as the negative electrode active material. The results are shown in Table 1.

Example 7

The same negative electrode active material as in Example 2 and lithium hydride were mixed at a weight ratio of 1:10, and heated at 600° C. for 1 hour in argon gas (lithium doping treatment). After the heat treatment of the negative electrode active material, a secondary battery was produced and evaluated in the same way as in Example 2. The results are shown in Table 1.

Example 8

The same negative electrode active material as in Example 2 and lithium aluminum hydride were mixed at a weight ratio of 1:10, and heated at 600° C. for 1 hour in argon gas (lithium doping treatment). After the heat treatment of the negative electrode active material, a secondary battery was produced and evaluated in the same way as in Example 2. The results are shown in Table 1.

Example 9

Tin having an average particle size of 5 μm as the metal (a) and silicon oxide having an average particle size of 10 μm as the oxide (b) were measured out at a weight ratio of 30:60 and mixed for 24 hours by so-called mechanical milling, to provide a metal-oxide composite particle having an average particle size of D50=5 to 10 μm in which the tin particles were dispersed in the oxide matrix. The oxide became amorphous to some extent by mechanical milling. The metal-oxide composite particle and graphite having an average particle size of 20 μm as the carbon material (c) were measured out at a weight ratio of 90:10 and mixed, to provide a negative electrode active material. A secondary battery was produced and evaluated in the same way as in Example 7, except that the negative electrode active material was used. The results are shown in Table 1.

Example 10

Tin having an average particle size of 5 μm as the metal (a), silicon oxide having an average particle size of 10 μm as the oxide (b), and graphite having an average particle size of 20 μm as the carbon material (c) were measured out at a weight ratio of 30:60:10 and mixed for 24 hours by so-called mechanical milling, to provide a negative electrode active material having an average particle size of D50=5 to 10 μm. By mechanical milling, the tin particles were dispersed in the oxide matrix, and the oxide became amorphous to some extent, and the carbon particles were localized in the vicinity of surfaces of the tin-oxide composite particles. A secondary battery was produced and evaluated in the same way as in Example 7, except that the negative electrode active material was used. The results are shown in Table 1.

Example 11

A mixed powder of silicon and silicon oxide (mixture of silicon oxide and silicon) represented by the general formula: SiO was subjected to CVD treatment in an atmosphere containing methane gas at 1150° C. for 6 hours, to provide a negative electrode active material in which silicon in silicon oxide was dispersed in the oxide matrix, and the oxide was amorphous, and the carbon particles were localized in the vicinity of surfaces of the coated mixed powder of silicon and silicon oxide. The weight ratio of silicon/silicon oxide/carbon was adjusted to approximately 30/60/10. A secondary battery was produced and evaluated in the same way as in Example 7, except that the negative electrode active material was used. The results are shown in Table 1.

Example 12

A secondary battery was produced and evaluated in the same way as in Example 11, except that trimethyl phosphate (MEP), TEP, and FEC were mixed at a ratio of 10:88:2 (volume ratio) and $LiPF_6$ as the supporting salt was dissolved therein at a concentration of 1 mol/L, which was used as the electrolyte. The results are shown in Table 1.

Example 13

A secondary battery was produced and evaluated in the same way as in Example 11, except that tris(trifluoromethyl)phosphate (TTFP), TEP, and FEC were mixed at a ratio of 10:88:2 (volume ratio) and $LiPF_6$ as the supporting salt was dissolved therein at a concentration of 1 mol/L, which was used as the electrolyte. The results are shown in Table 1.

Example 14

A secondary battery was produced and evaluated in the same way as in Example 11, except that TEP and cis-1,2-difluoroethylene carbonate (DFEC) were mixed at a ratio of 98:2 (volume ratio) and $LiPF_6$ as the supporting salt was dissolved therein at a concentration of 1 mol/L, which was used as the electrolyte. The results are shown in Table 1.

Example 15

A secondary battery was produced and evaluated in the same way as in Example 11, except that polyimide (PI, made by Ube Industries, Ltd., trade name: U-Varnish A) was used as the negative electrode binder. The results are shown in Table 1.

Example 16

A secondary battery was produced and evaluated in the same way as in Example 11, except that a mixture of polyamide-imide (PAL made by Toyobo Co., Ltd., trade name: VYLOMAX®) and polyimide (PI, made by Ube Industries, Ltd., trade name: U-Varnish A) at a weight ratio of 1:1 was used as the negative electrode binder. The results are shown in Table 1.

TABLE 1

| | Negative electrode active material | State of metal | Oxide | State of carbon | Phosphate ester (Vol %) | | Fluorinated carbonate (Vol %) | | Cyclic/chain carbonate (Vol %) |
|---|---|---|---|---|---|---|---|---|---|
| Example 1 | Sn—SiO—C | Non-dispersed | Crystalline | Non-localized | TEP | 99 | FEC | 1 | 0 |
| Example 2 | Sn—SiO—C | Non-dispersed | Crystalline | Non-localized | TEP | 98 | FEC | 2 | 0 |
| Example 3 | Sn—SiO—C | Non-dispersed | Crystalline | Non-localized | TEP | 95 | FEC | 5 | 0 |
| Example 4 | Sn—SiO—C | Non-dispersed | Crystalline | Non-localized | TEP | 90 | FEC | 10 | 0 |
| Example 5 | Sn—SiO—C | Non-dispersed | Crystalline | Non-localized | TEP | 70 | FEC | 1 | 29 |
| Example 6 | Sn—SiO—C | Non-dispersed | Crystalline | Non-localized | TEP | 70 | FEC | 15 | 15 |
| Comparative Example 1 | Sn—SiO—C | Non-dispersed | Crystalline | Non-localized | TEP | 99 | FEC | 0 | 1 |
| Comparative Example 2 | Sn—SiO—C | Non-dispersed | Crystalline | Non-localized | TEP | 65 | FEC | 0 | 35 |
| Comparative Example 3 | Sn—SiO—C | Non-dispersed | Crystalline | Non-localized | TEP | 63 | FEC | 2 | 35 |
| Comparative Example 4 | Sn—SiO—C | Non-dispersed | Crystalline | Non-localized | TEP | 80 | FEC | 20 | 0 |
| Comparative Example 5 | C | — | | Non-localized | TEP | 98 | FEC | 2 | 0 |
| Comparative Example 6 | Si—C | — | | Non-localized | TEP | 98 | FEC | 2 | 0 |
| Example 7 | Sn—SiO—C | Non-dispersed | Crystalline | Non-localized | TEP | 98 | FEC | 2 | 0 |
| Example 8 | Sn—SiO—C | Non-dispersed | Crystalline | Non-localized | TEP | 98 | FEC | 2 | 0 |
| Example 9 | Sn—SiO—C | Dispersed | Amorphous | Non-localized | TEP | 98 | FEC | 2 | 0 |
| Example 10 | Sn—SiO—C | Dispersed | Amorphous | Localized | TEP | 98 | FEC | 2 | 0 |
| Example 11 | Si—SiO—C | Dispersed | Amorphous | Localized | TEP | 98 | FEC | 2 | 0 |
| Example 12 | Si—SiO—C | Dispersed | Amorphous | Localized | TEP + MEP | 98 | FEC | 2 | 0 |
| Example 13 | Si—SiO—C | Dispersed | Amorphous | Localized | TEP + TTFP | 98 | FEC | 2 | 0 |
| Example 14 | Si—SiO—C | Dispersed | Amorphous | Localized | TEP | 98 | DFEC | 2 | 0 |
| Example 15 | Si—SiO—C | Dispersed | Amorphous | Localized | TEP | 98 | FEC | 2 | 0 |
| Example 16 | Si—SiO—C | Dispersed | Amorphous | Localized | TEP | 98 | FEC | 2 | 0 |

| | With or without of lithium doping Lithium doping agent | Binder | Initial discharge capacity (mAh) | Retention after 50 cycles (%) | Temperature increase after impact test (° C.) |
|---|---|---|---|---|---|
| Example 1 | None | PAI | 810 | 55 | 5° C. or less |
| Example 2 | None | PAI | 805 | 52 | 5° C. or less |
| Example 3 | None | PAI | 811 | 52 | 5° C. or less |
| Example 4 | None | PAI | 791 | 51 | 5° C. or less |
| Example 5 | None | PAI | 825 | 56 | 5° C. or less |
| Example 6 | None | PAI | 775 | 61 | 5° C. or less |

TABLE 1-continued

|  | | | | | |
|---|---|---|---|---|---|
| Comparative Example 1 | None | PAI | 25 | — | — |
| Comparative Example 2 | None | PAI | 35 | — | — |
| Comparative Example 3 | None | PAI | 823 | 54 | 22 |
| Comparative Example 4 | None | PAI | 905 | 51 | 15 |
| Comparative Example 5 | None | PAI | 85 | — | — |
| Comparative Example 6 | None | PAI | 1818 | 12 | 5° C. or less |
| Example 7 | Lithium hydride | PAI | 1055 | 53 | 5° C. or less |
| Example 8 | Lithium aluminum hydride | PAI | 901 | 51 | 5° C. or less |
| Example 9 | Lithium hydride | PAI | 1109 | 59 | 5° C. or less |
| Example 10 | Lithium hydride | PAI | 1188 | 65 | 5° C. or less |
| Example 11 | Lithium hydride | PAI | 1612 | 84 | 5° C. or less |
| Example 12 | Lithium hydride | PAI | 1533 | 81 | 5° C. or less |
| Example 13 | Lithium hydride | PAI | 1556 | 84 | 5° C. or less |
| Example 14 | Lithium hydride | PAI | 1551 | 79 | 5° C. or less |
| Example 15 | Lithium hydride | PI | 1497 | 88 | 5° C. or less |
| Example 16 | Lithium hydride | PAI + PI | 1550 | 85 | 5° C. or less |

In the case of the electrolyte which contain phosphate ester (TEP) and no fluorinated carbonate (FEC), the battery did not work, or the initial discharge capacity was extremely low (Comparative Examples 1 to 2). It appears that this was because the decomposition of TEP occurred. It has been found, however, that a battery will work, and the initial discharge capacity will be higher when a small amount of FEC is added to TEP (Examples 1 to 16). It appears that this was because a good film which readily reacted with lithium ions in the electrolyte was formed on the surface of the non-carbon negative electrode by the addition of FEC.

In the case of the use of graphite only as the negative electrode active material, this effect was not confirmed (Comparative Example 5), and therefore it was confirmed that this effect was unique to the case of the use of the non-carbon negative electrode active material. It is presumed that when lithium ions are intercalated between the layers of the carbon negative electrode, TEP coordinated to lithium ion is intercalated between the layers and damages the graphite layer. It is presumed that in the case where an alloy, an oxide, and carbon are combined or mixed in a negative electrode, lithium ions are intercalated into the graphite layer in a stepwise manner, and therefore rapid degradation does not occur (Examples 1 to 16).

Moreover, the results of the impact tests revealed that the cell which comprised the electrolyte having a TEP content of 70 vol % or more exhibited little change in cell temperature even when being impacted (Examples 1 to 16). In contrast, it was confirmed that the cell which comprised the electrolyte having a TEP content of 63 vol % exhibited great change in cell temperature after the impact test, even though the electrolyte contained FEC (Comparative Example 3). In addition, the cell which comprised the electrolyte having a FEC content of 20 vol % exhibited great change in cell temperature after the impact test, even though the electrolyte had a TEP content of 70 vol % or more (Comparative Example 4).

INDUSTRIAL APPLICABILITY

The secondary battery of the present invention may be used in any industrial field where power supply is needed, and in industrial fields related to transport, storage, and supply of electric energy. More specifically, the secondary battery may be used for power sources for mobile devices such as cellular phone and notebook computer; power sources for transfer/transport vehicles including electrically-powered vehicles such as electric vehicle, hybrid vehicle, electric motorcycle and power-assisted bicycle, electric train, satellite, and submarine; backup power sources such as UPS; power storage system to store electric power generated by solar power generation, wind power generation, or the like; and the like.

REFERENCE SIGNS LIST a negative electrode
b separator
c positive electrode
d negative electrode current collector
e positive electrode current collector
f positive electrode terminal
g negative electrode terminal

The invention claimed is:

1. A secondary battery, comprising an electrode element comprising a positive electrode and a negative electrode placed opposite to each other, an electrolyte, and an outer package housing the electrode element and the electrolyte; wherein
   the negative electrode is formed by binding a negative electrode active material, which comprises a metal (a) capable of being alloyed with lithium, a metal oxide (b) capable of intercalating/deintercalating lithium ions, and a carbon material (c) capable of intercalating/deintercalating lithium ions, to a negative electrode current collector with a negative electrode binder; and
   the electrolyte comprises a lithium salt dissolved in a solvent comprising 65 vol % or more of a phosphate ester compound, and more than 0 vol % and less than 20 vol % of a fluorinated carbonate compound.

2. The secondary battery according to claim 1, wherein the solvent of the electrolyte comprises 70 to 99 vol % of the phosphate ester compound, and 1 to 15 vol % of the fluorinated carbonate compound.

3. The secondary battery according to claim 1, wherein the negative electrode active material is mixed with lithium hydride and/or lithium aluminum hydride, and then subjected to heat treatment at a temperature of 200° C. or higher and 800° C. or lower.

4. The secondary battery according to claim 1, wherein the phosphate ester compound is a compound represented by the following formula (1):

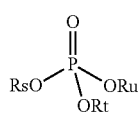
(1)

wherein Rs, Rt, and Ru each independently represents alkyl group, halogenated alkyl group, alkenyl group, halogenated alkenyl group, aryl group, cycloalkyl group, halogenated cycloalkyl group, or silyl group; or any two of, or all of Rs, Rt, and Ru are combined to form a cyclic structure.

5. The secondary battery according to claim 4, wherein each of Rs, Rt, and Ru in the formula (1) is alkyl group having 10 or less carbon atoms.

6. The secondary battery according to claim 1, wherein the fluorinated carbonate compound is a compound represented by the following formula (2a) or (2b):

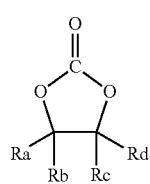
(2a)

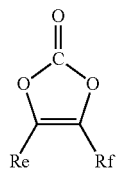
(2b)

wherein Ra, Rb, Rc, Rd, Re, and Rf each independently represents hydrogen atom, alkyl group, halogenated alkyl group, halogen atom, alkenyl group, halogenated alkenyl group, cyano group, amino group, nitro group, alkoxy group, halogenated alkoxy group, cycloalkyl group, halogenated cycloalkyl group, or silyl group; provided that at least one of Ra, Rb, Rc, and Rd is fluorine atom, fluorinated alkyl group, fluorinated alkenyl group, fluorinated alkoxy group, or fluorinated cycloalkyl group, and at least one of Re and Rf is fluorine atom, fluorinated alkyl group, fluorinated alkenyl group, fluorinated alkoxy group, or fluorinated cycloalkyl group; or a compound represented by the following formula (3):

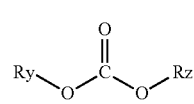
(3)

wherein Ry and Rz each independently represents hydrogen atom, alkyl group, halogenated alkyl group, halogen atom, alkenyl group, halogenated alkenyl group, cyano group, amino group, nitro group, alkoxy group, halogenated alkoxy group, cycloalkyl group, halogenated cycloalkyl group, or silyl group; provided that at least one of Ry and Rz is fluorine atom, fluorinated alkyl group, fluorinated alkenyl group, fluorinated alkoxy group, or fluorinated cycloalkyl group.

7. The secondary battery according to claim 6, wherein the fluorinated carbonate compound is fluoroethylene carbonate or difluoroethylene carbonate.

8. The secondary battery according to claim 1, wherein the metal (a) is dispersed in the metal oxide (b).

9. The secondary battery according to claim 1, wherein the metal oxide (b) has an amorphous structure.

10. The secondary battery according to claim 9, wherein the carbon material (c) is coating a particle in which the metal (a) is dispersed in the metal oxide (b) having an amorphous structure.

11. The secondary battery according to claim 1, wherein the metal (a) is silicon, and the oxide (b) is silicon oxide.

12. The secondary battery according to claim 1, wherein the negative electrode binder consists of polyimide, polyamide-imide, or a mixture of polyimide and polyamide-imide.

13. The secondary battery according to claim 1, wherein the electrode element has a planar stacked structure.

14. The secondary battery according to claim 1, wherein the outer package is an aluminum laminate film.

* * * * *